J. T. LISTER.
TIRE FORMING APPARATUS.
APPLICATION FILED APR. 14, 1913.

1,190,432.

Patented July 11, 1916.
3 SHEETS—SHEET 1.

Witnesses
E. B. Gilchrist
N. C. Hubbard

Inventor
John T. Lister
by Thurston & Kwis
Attys.

J. T. LISTER.
TIRE FORMING APPARATUS.
APPLICATION FILED APR. 14, 1913.
1,190,432.
Patented July 11, 1916.
3 SHEETS—SHEET 2.
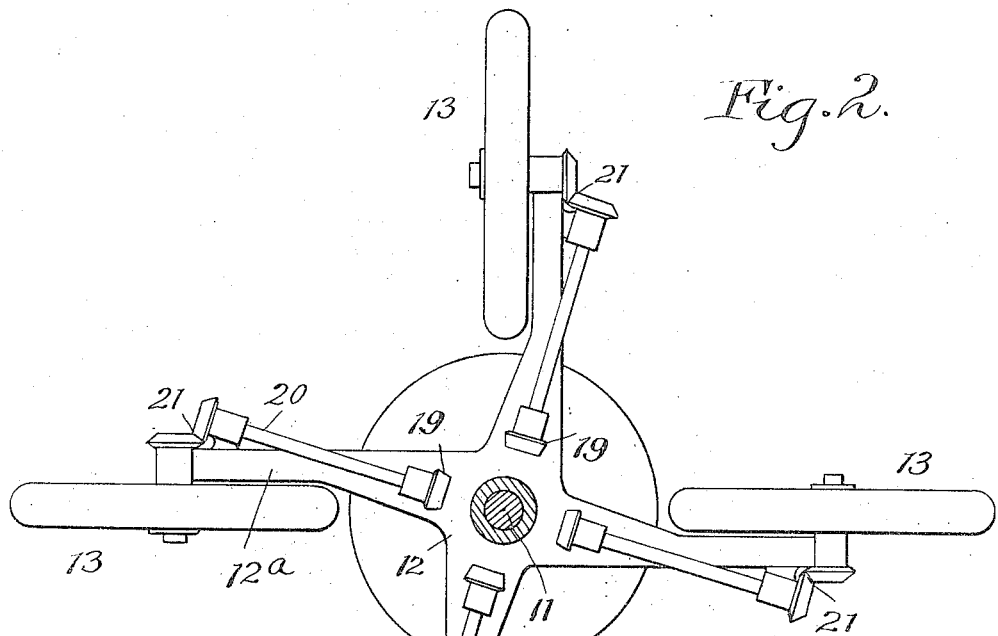
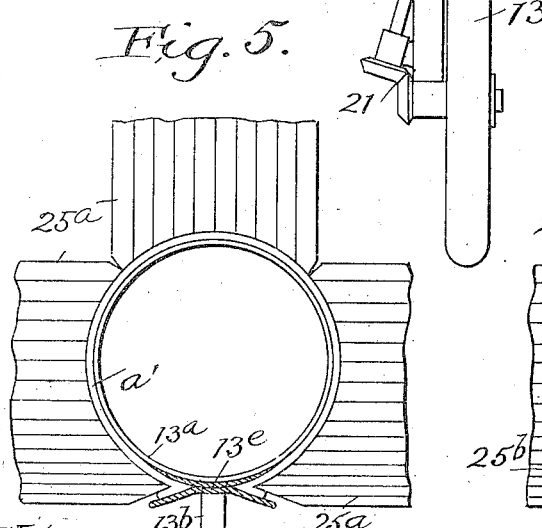
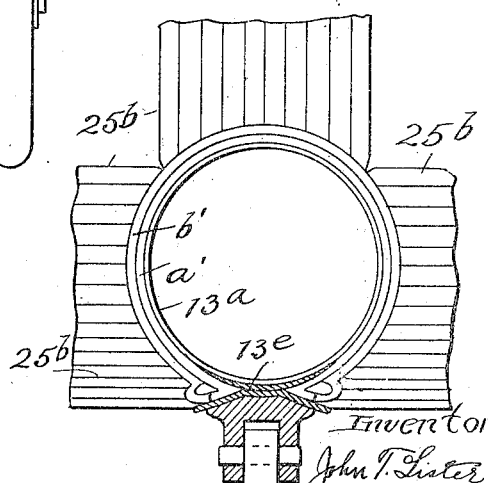

J. T. LISTER.
TIRE FORMING APPARATUS.
APPLICATION FILED APR. 14, 1913.

1,190,432.

Patented July 11, 1916.
3 SHEETS—SHEET 3.

Witnesses
E. B. Gilchrist
H. C. Hubbard

Inventor
John T. Lister
by Thurston & Kwis
Attys.

UNITED STATES PATENT OFFICE.

JOHN T. LISTER, OF CLEVELAND, OHIO.

TIRE-FORMING APPARATUS.

1,190,432.    Specification of Letters Patent.    Patented July 11, 1916.

Application filed April 14, 1913. Serial No. 760,896.

*To all whom it may concern:*

Be it known that I, JOHN T. LISTER, a citizen of the United States, residing at Cleveland, in the county of Cuyahoga and State of Ohio, have invented a certain new and useful Improvement in Tire-Forming Apparatus, of which the following is a full, clear, and exact description.

This invention relates to a tire forming apparatus for making outer casings of ordinary automobile tires, and has for its chief object to provide a tire forming machine or apparatus by which efficient tires can be made much more quickly than they can be made at the present time, either by hand or by the machines now employed.

In a machine constructed in accordance with the preferred form of my invention, a number of collapsible cores are employed, the cores being carried by a revoluble form and being adapted to have wound thereon tire forming material which is fed from different sources of supply, and is adapted to be compressed by suitable compressing rollers. The whole is so arranged that while the initial or inner layers for one tire are wound and compressed on one core, the material forming the next or relatively outer part of a second tire is wound and compressed on another core occupying a different position. By the rotation of the frame and the cores, the different cores can be successively brought to different positions in proper relationship with respect to the sources of supply and compressors corresponding to the different positions, so that a plurality of tires are each progressively constructed until each passes through or beyond the final position. Thence, as a core passes from the last to the first or initial position, the material forming the inner part of a tire is again wound on the core.

My invention may be briefly summarized as consisting in certain novel details of construction and combinations and arrangements of parts which will be described in the specification, and set forth in the appended claims.

Figure 1:
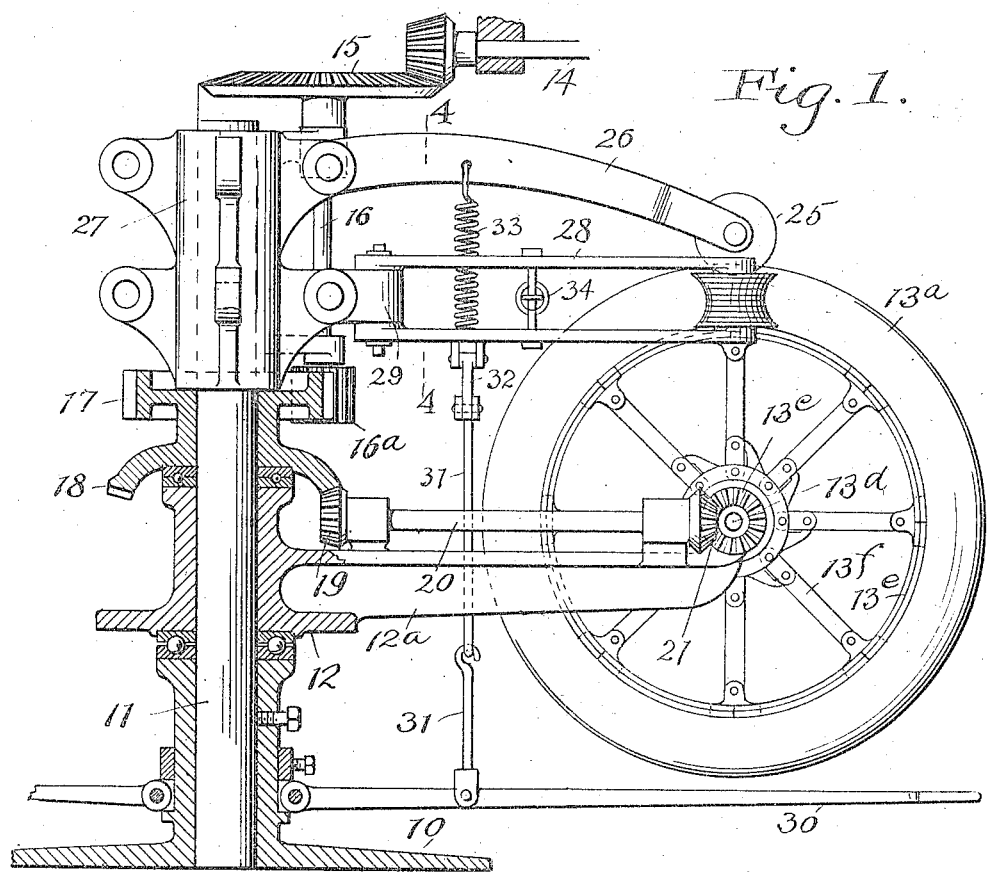
Figure 7:
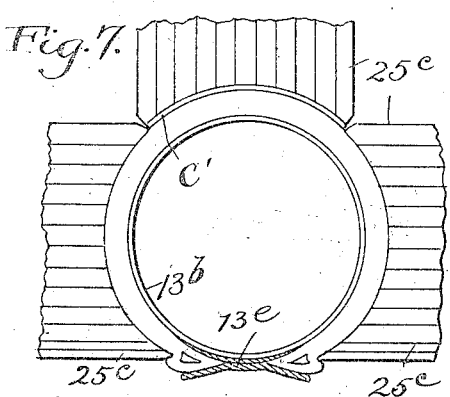
Figure 8:
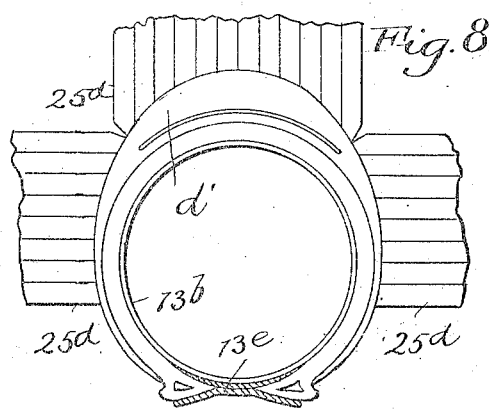
Figure 3:
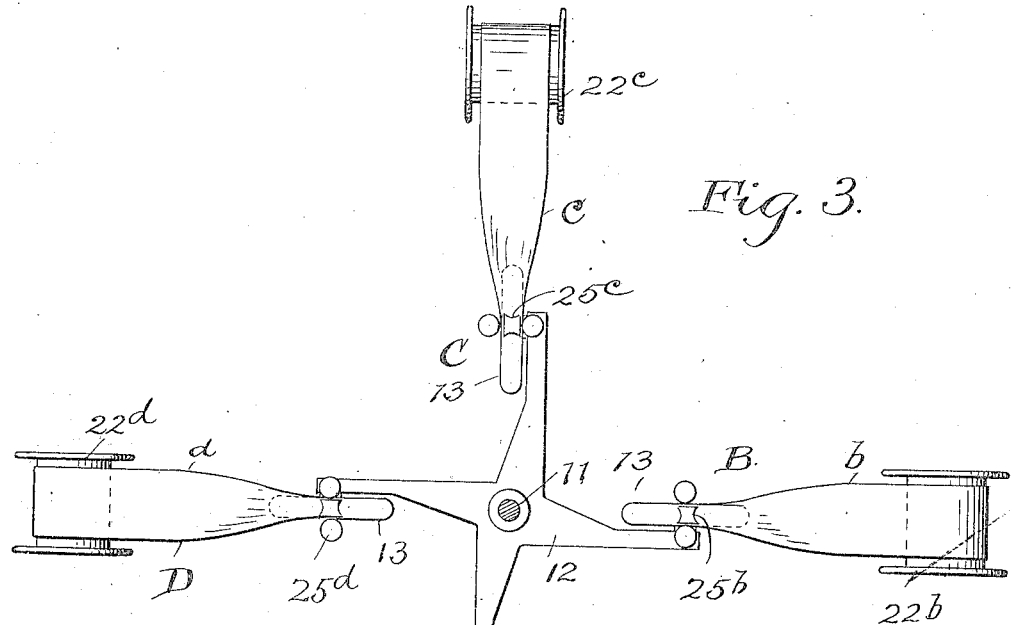
Figure 4:
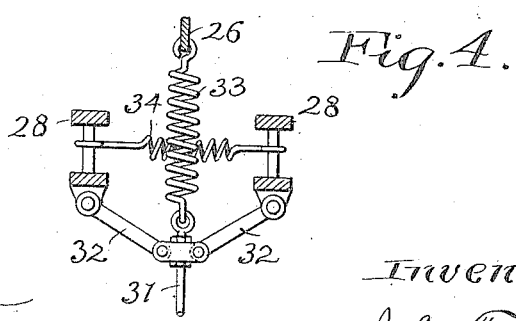

In the accompanying sheets of drawings, wherein the preferred construction is shown, Figure 1 is a partial elevation and partial sectional view of a part of the machine showing one of the cores only; Fig. 2 is a plan view showing the revoluble frame provided with four cores; Fig. 3 is a diagrammatic plan view showing the four cores and the manner in which the tire forming material can be supplied thereto; Fig. 4 is a transverse sectional view substantially along the line 4—4 of Fig. 1, through the supporting members for one set of compressors; and Figs. 5 to 8 are views partly diagrammatic, showing the tire in its different stages of completion, or showing how the tire is progressively built in the different tire forming positions, these views showing also the rollers or compressors which are utilized to compress the material onto the core.

Referring now to the drawings, it will be seen that the machine includes a suitable base 10 in which is secured in fixed position an upright shaft or standard 11, on which is supported for revoluble movement in a horizontal direction, a core supporting frame 12. This frame, as will be observed from Fig. 2, is provided with four equally spaced outstanding arms 12$^a$, each of which is adapted to support a rotary collapsible core 13, which is adapted to be rotated about its axis in a vertical plane, as shown in the drawings. Each of these cores includes an outer collapsible form or core proper 13$^a$, upon which the tire is adapted to be constructed, and which preferably consists of an inflatable rubber tube which can be inflated with compressed air in the same manner as an inner tube of an ordinary tire is inflated, a valve stem 13$^b$ for this purpose, being shown in Fig. 5. The collapsible core also includes a hub 13$^c$ mounted upon a horizontal spindle 13$^d$, suitably supported at the outer end of one of the arms 12$^a$. The form 13$^a$ is supported from the hub by means of a sectional rim 13$^e$, preferably composed of eight sections, and collapsible spokes 13$^f$, each composed of two parts or links pivotally connected together between the rim and the hub and also pivotally connected to the hub and to a yoke which supports the adjacent ends of two of the rim sections. Each pair of links constituting one of these spokes ordinarily serves as a toggle to hold the corresponding rim sections outward in normal position, but when the toggles are broken, or when the link spokes are collapsed, the rim and form may be collapsed.

The four cores are adapted to be rotated on their respective axes by the following mechanism. Suitably supported in any desired manner above the shaft 11 is a horizontal driving shaft 14 connected by bevel gearing 15 to a vertical shaft 16, extending alongside the upper part of the shaft or standard 11. This shaft has at its lower end a gear 16a, which meshes with a larger gear 17, supported so as to rotate about the shaft or standard 11 above the hub of the revoluble frame 12. This gear rotates a bevel gear 18 which is engaged by four bevel gears 19, secured to the inner ends of shafts 20, the outer ends of which are connected by bevel gearing 21 to the short spindles upon which the collapsible cores 13 are mounted.

As before stated, the tire forming material is adapted to be simultaneously supplied to the different cores. The tire forming material may be supplied from reels 22 which may be suitably supported with reference to the movable cores so that each may supply to a core when the latter is in tire forming position, a tire forming strip,—whether of rubber or rubberized fabric. Inasmuch as the tire is built progressively, as the core is moved from position to position, or from the point of feed of one reel to the point of feed of the next reel, etc., these different reels are provided with materials which are adapted to form different portions of the tire. For example, reel 22a may supply to the core in position marked A (Fig. 3), opposite said reel, rubberized fabric $a$ which forms the tire foundation $a'$, (see Fig. 5). At the same time, reel 22b supplies strip or sheet rubber $b$ to the core in position B,— this core having been previously provided with the rubberized fabric for the tire foundation. Fig. 6 shows a partly completed tire after it is supplied with the strip rubber forming the rubber coating $b'$ which covers the tire foundation. Likewise at the same time, reel 22c supplies to the core in position C, rubberized fabric $c$ which forms the tread reinforcement $c'$ (see Fig. 7) of the partly completed tire, and reel 22d supplies to a core in position D the sheet or strip rubber $d$ so as to form the final outer covering $d'$; the tire thus formed being shown in Fig. 8.

The tire, after it has received the layers forming the outer covering in position D is completed, as far as this apparatus is concerned, and is ready for the vulcanizing molds. This core will now be collapsed, the tire will be removed, after which the core will then be again erected, and when it is again moved to position A, it is ready to receive the foundation strip $a$ for another tire.

As the material is fed from the sources of supply and wound on the cores, it is compressed by compressors or pressing rollers 25. As there are four cores and four winding positions, the sets are shaped so that the tire engaging portions of the compressors correspond substantially in shape to the shape of the tire at the different stages of completion in the different winding positions. Each set of compressors consists of three rollers, one of which engages the periphery of the tire, or partially completed tire, and two which engage the sides thereof. Each roller preferably consists of a plurality of separately movable sections so that all parts of the roller will have a true rolling engagement on the tire, and slippage will be practically avoided. One set of rollers is shown in Fig. 1, and in Figs. 5, 6, 7 and 8, are shown portions of the rollers of the four sets, those used in position A being designated 25a; those in position B—25b; those in position C—25c; and those in position D—25d.

The rollers of each set are separately mounted or supported in such a manner that they can be brought into compressing engagement with the tire or allowed to swing away from the same, and are also so mounted that they can be swung upwardly from the tire and core, so that the series of cores can be revolved or given a quarter turn relative to the compressors, it being understood that in revolving or positioning the cores, the latter are positioned not only relative to the source of supply, but also with reference to the compressors.

In Fig. 1, is shown the manner of mounting and supporting one set of compressors, all four sets of which are similarly mounted and supported. It will be observed by reference to this figure that the compressor which engages the periphery of the tire, is supported on the outer end of an arm 26, which at its inner end is pivotally supported on a sleeve-like member 27, fixed in position at the upper end of the vertical shaft or standard 11. The two compressors which engage the side portions of the tire are mounted in the outer ends of a pair of arms 28, pivotally connected to a member 29 in such a manner that said arms may swing horizontally to and from the core. This member 29 is pivotally connected to the fixed sleeve 27 in such a manner that both arms 28 may be swung upwardly above the core, and above the path of movement of the cores, as the same are revolved from position to position. Normally, the compressors are out of engagement with the core or tire, or they may be shifted to compressing position by the following described mechanism.

Below each set of compressors and below the core which may be in winding position is a pivoted treadle or foot lever 30 pivoted at its inner end to the base 10, so that it may be rocked in a vertical plane. This lever is connected by an upwardly extending two-part link 31 to a pair of toggle links 32, pivotally connected at their outer ends to the two arms 28. (See Fig. 4.) The upper end of the link 31 is connected by a rather stiff coil spring 33 to the pivoted arm 26 which supports the upper compressing roller, and the two pivoted arms 28 which support the side compressors are connected together by a spring 34. As the treadle or foot-lever 30 is depressed, the upper roller is pulled down onto the tire or core, and the side rollers are pulled inward into compressing position. When the operator removes his foot from the treadle, the spring 33 which was previously under tension, relieves the pressure on the upper compressor, and the links 32, by being pulled upwardly, separate the side compressors. The spring 34 is somewhat weaker than the spring 33, and its chief function is to equalize the pressure of the two side compressors, when serving to press the tire forming material onto the core.

When it is desired to revolve the series of cores so as to move each core forwardly one step, or from one winding position to the next successive winding position, the two parts of the link 31 are disconnected. The compressing rollers and their supporting arms are swung upwardly above the cores, and thence the cores and the frame supporting them may be revolved freely to bring each core to the next succeeding position, as previously stated.

It will be understood from the above description, that tires can be formed with the machine with rapidity, especially as four tires are simultaneously in the process of construction, and as each tire is gradually built up or constructed, as it passes through the series of winding and compressing positions.

I have shown and described only the preferred construction, but I am aware that the principle of the machine or apparatus can be carried out with mechanism somewhat differently constructed. Especially do I regard it as within the scope of my invention to vary the number of cores on which the winding is done from the precise number shown in the preferred construction, and while I prefer to revolve the cores relative to the compressors and relative to the sources of supply, practically the same results could be obtained, although not so effectively, by otherwise causing relative movement between said parts to take place. I therefore do not desire to be confined to any precise details, or to any mechanism, except as I am expressly limited by the terms of the appended claims.

Having thus described my invention, what I claim is:

1. In a tire forming machine, a plurality of cores, a plurality of sets of compressors adapted to compress tire forming material wound on the cores and each adapted to compress on each core material forming a definite part of a tire, and means whereby the cores and compressors may be relatively shifted so that each core is successively positioned into working relationship with each of the different sets of compressors.

2. In a tire forming machine, a plurality of cores, a support therefor permitting each core to be rotated about its own axis, a plurality of sets of compressors adapted to compress tire forming material wound upon the cores and each being adapted to compress on each core material corresponding to a definite part of a tire, and means whereby the cores and compressors may be relatively shifted so that each set of compressors may be caused to compress tire forming material on each core.

3. In a tire forming machine, a plurality of cores, a plurality of sets of compressors adapted to compress tire forming material wound on the cores and each adapted to compress material forming a definite part of a tire, and means whereby the cores and compressors may be relatively rotated so that each core is successively positioned into working relationship with each of the different sets of compressors.

4. In a tire forming machine, a plurality of cores, a plurality of sets of compressors adapted to compress tire forming material wound on the cores and each coöperating with each core and adapted to compress thereon material forming a definite part of the tire, and means whereby the cores may be shifted relatively to the compressors so that each core is brought successively into working relationship with each of the different sets of compressors.

5. In a tire forming machine, a plurality of cores, a plurality of sets of compressors adapted to compress tire forming material wound on the cores and each coöperating with each core and adapted to compress thereon material forming a definite part of the tire, and means whereby the cores may be rotated relatively to the compressors so as to bring each core successively into working relationship with each of the different sets of compressors.

6. In a tire forming machine, a plurality of cores, a horizontally rotatable frame supporting said cores, each core being supported by said frame for rotary movement about the core axis, and a plurality of sets of compressors adapted to compress tire forming material as it is wound upon the cores, and each coöperating with each core and adapted to compress thereon material forming a definite part of the tire, said frame when rotated step by step serving to bring each core into working relationship successively with each of the different sets of compressors.

7. In a tire forming apparatus, a plurality of cores, a plurality of sources of supply of tire forming material, and means by which tire forming material from each of the different sources of supply may be supplied successively onto each of the different cores.

8. In a tire forming machine, a rotary frame, a plurality of cores rotatably supported by the frame, a plurality of sets of compressors adapted to compress tire forming material wound upon the cores, each set being adapted to compress on each core material forming a definite part of a tire and each core being adapted by the rotation of the frame to be brought successively into working relationship with each of the different sets of compressors.

9. In a tire forming machine, a rotary frame, a plurality of cores supported thereby, each being adapted to be rotated about its axis, and a plurality of sets of compressors having movable supports which adapt the compressors to be moved toward or away from the core, each set of compressors coöperating with each core and being shaped to compress on each core material forming a definite part of a tire, said movable frame when rotated serving to move each core into working relationship with each of the different sets of compressors.

10. In a tire forming machine, a rotary frame, a plurality of cores carried by the frame, means by which each core may be rotated about its axis, and a plurality of sets of compressors spaced and supported about the axis of movement of the frame so that the different sets coöperate with the different cores to compress material wound on the latter, each set of compressors having swinging supports which enable the compressors to be moved toward and from the core, and each set of compressors coöperating with each core and being shaped to compress tire forming material which forms a definite part of a tire, said frame serving when rotated step by step to bring each core successively into working relationship with each of the different sets of compressors.

11. In a tire forming apparatus, a plurality of cores, a plurality of sources of supply of tire forming material, each adapted to feed to each of the different cores material forming a definite part of the tire formed thereon, and means by which the cores are successively brought to tire forming positions with respect to each of the sources of supply so that each core receives tire forming material successively from the different sources of supply.

12. In a tire forming apparatus, a plurality of cores, a plurality of sources of supply for tire forming material, each adapted to supply to each of the different cores material forming a definite part of a tire, a plurality of sets of compressors corresponding in number and position with the sources of supply and the line of feed therefrom, and means whereby the different cores may be brought successively to different tire forming positions with respect to each of the sets of compressors and sources of supply so that each core may receive successively from the different sources of supply tire forming material which is compressed by the different sets of compressors.

In testimony whereof, I hereunto affix my signature in the presence of two witnesses.

JOHN T. LISTER

Witnesses:
  N. E. HUBBARD,
  A. F. KWIS.